(No Model.)
W. TYREE.
APPARATUS FOR HEAVING LINES OR ROPES.
No. 561,295. Patented June 2, 1896.
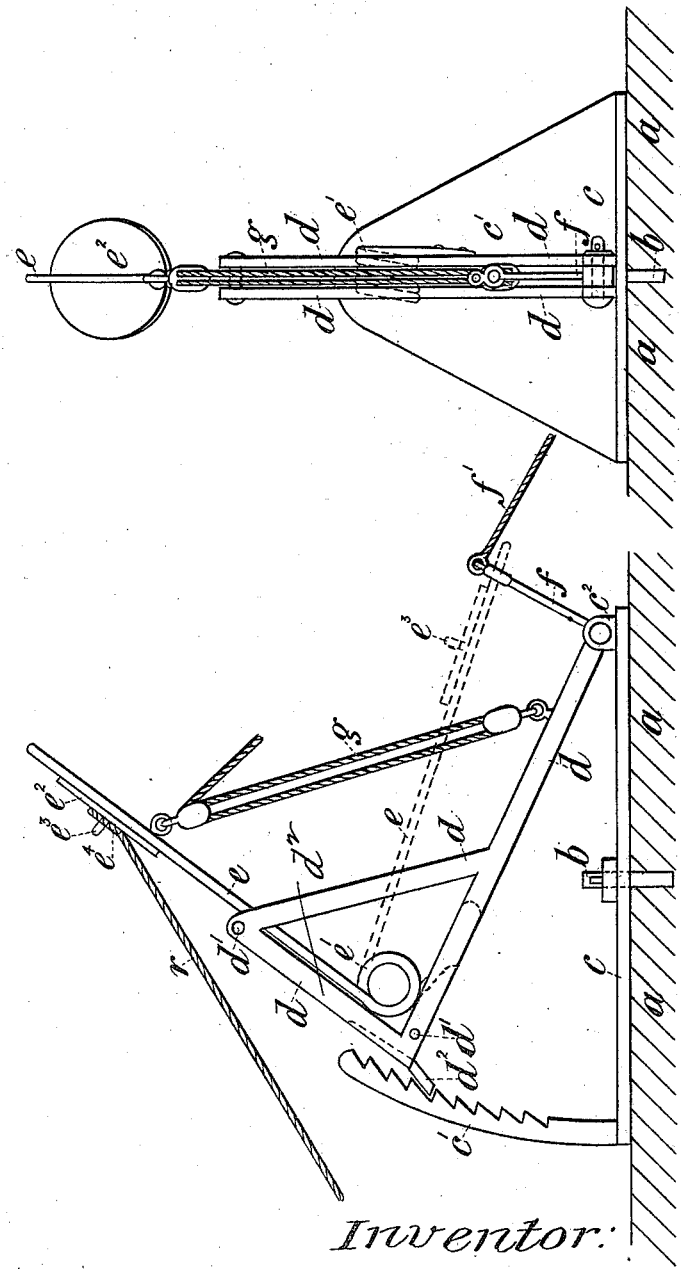
Witnesses:
E. B. Bolton
H. van Oldemeel
Inventor:
William Tyree
By Richards
his Attorneys.

UNITED STATES PATENT OFFICE.

WILLIAM TYREE, OF WELLINGTON, NEW ZEALAND.

APPARATUS FOR HEAVING LINES OR ROPES.

SPECIFICATION forming part of Letters Patent No. 561,295, dated June 2, 1896.

Application filed September 7, 1895. Serial No. 561,770. (No model.) Patented in England November 23, 1895, No. 18,466.

*To all whom it may concern:*

Be it known that I, WILLIAM TYREE, a subject of the Queen of Great Britain, residing at 42 Lambton Quay, in the city of Wellington, in the Colony of New Zealand, have invented new or Improved Apparatus for Heaving Lines or Ropes, (for which I have obtained a patent in Great Britain, dated November 23, 1895, No. 18,466,) of which the following is a specification.

My apparatus is illustrated on the accompanying sheet of drawings, on which—

Figure 1 is a side view, and Fig. 2 an end view, of my apparatus.

Similar letters refer to similar parts in both the figures.

$a$ is the deck of the ship or the platform on which the apparatus rests and is fastened by a pin or bolt $b$, on which bolt as a center the apparatus can be turned or swiveled to direct the missile to the right or left, as desired.

$c$ is a plate, made preferably of wrought-iron, which carries an upright $c'$, to which is attached an upright rack or ratchet bar for a purpose to be hereinafter described.

$c^2$ is a jaw or joint forming a part of or fastened to the plate $c$, to which are hinged two frames $d$, stayed together at a short distance apart by stays $d'$ and resting by a spring-pawl $d^2$ upon the teeth of the ratchet or rack $c'$. It will be evident that by this arrangement the frames $d$ can move in the joint $c^2$, while their opposite ends can be raised or lowered by the spring-pawl $d^2$.

$e$ is a standard or rod, of steel, supported at the free end of the frames $d$ and formed into a spiral spring at $e'$, so that it can be depressed into the position shown by the dotted lines and held in that position by a catch or trigger $f$, which has a hand-rope $f'$ attached to it. On the outer extremity of this rod $e$ is fixed a plate $e^2$, fitted with a pin or hook $e^3$ to receive and hold loosely the end of the line to be thrown, and which is generally provided with a weight or ring $e^4$.

$g$ are a set of blocks and falls to assist in lowering the rod $e$ from its position.

The standard $e$ is stopped by the cross-stay $d'$ in a position at right angles to the frame $d$, the said frame having the upwardly-extending portions $d^2$.

The action of my apparatus is as follows: The whole being held to the deck by the pin $b$ and set at the desired position to right or left, according to the place to which it is required to throw the line, the frames $d$ are elevated in the rack $c'$, so as to be at the proper elevation to throw the said line to the desired distance. The spring-rod $e$ is then drawn down to the position shown in dotted lines and fastened by the catch or trigger $f$. The weight or loop of the line to be thrown is then placed on the pin or hook $e^3$. When the trigger or hook $f$ is pulled by the hand-line $f'$, the rod $e$ will throw the end of the line $r$ or anything attached to it to the spot for which the machine is set. It will be evident that the rope $r$ may be of any length. Moreover, the rack or ratchet $c'$ may be replaced by a rack and pinion, and the block and falls $g$ may be dispensed with and the steel rod $e$ lowered by hand or other well-known means.

What I do claim as my invention, and desire to secure by Letters Patent, is—

1. In combination, the base, the frame pivoted thereto, the rack and pawl for holding the free end of the pivoted frame adjustably, the spring-rod carried by the pivoted frame and adjustable therewith, the rope-holder on the spring-rod and the trigger for controlling the release of the spring-rod, substantially as described.

2. In combination in a heaving or line-throwing device, the base-plate, the frame pivoted thereto, means for holding the frame in different inclined positions, a spring-rod supported at the free end of the pivoted frame and a stop on the frame for limiting the movement of the spring-rod to a position substantially at right angles to the frame $d$, substantially as described.

3. In combination, in a heaving or line-throwing apparatus, the base-plate $c$, the two-part frame $d$ pivoted thereto and having the upwardly-extending portions, the spring-rod $e$ supported at the free end of the frame, means for adjusting the inclination of the frame $d$ and means for holding and releasing the spring-arm, and the cross-brace $d'$ at the upper part of the upwardly-extending portions of the frame, said upwardly-extending portions of the frame with the cross-brace $d'$ being carried on the free end of the said frame, substantially as described.

WILLIAM TYREE.

Witnesses:
W. E. HUGHES,
W. ALEXANDER.